Figure 1:
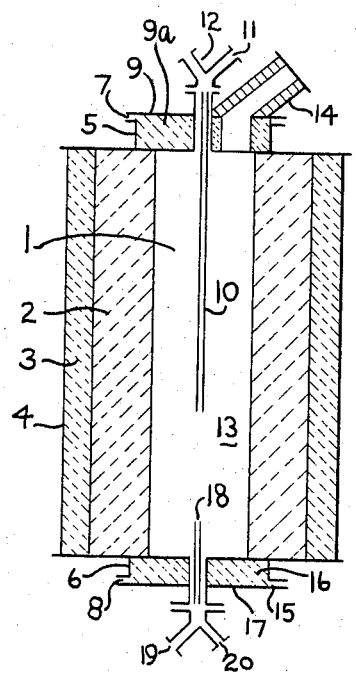

Oct. 31, 1967   A. E. CALLOW ET AL   3,350,171
VAPOUR PHASE OXIDATION
Original Filed Nov. 18, 1958                              2 Sheets-Sheet 1

INVENTORS
ALAN EDWARD CALLOW
WILLIAM HUGHES
JAMES DENNIS GROVES

Oscar L. Spencer
ATTORNEY

Oct. 31, 1967  A. E. CALLOW ET AL  3,350,171
VAPOUR PHASE OXIDATION

Original Filed Nov. 18, 1958

2 Sheets-Sheet 2

INVENTORS
ALAN EDWARD CALLOW
WILLIAM HUGHES
JAMES DENNIS GROVES

Oscar L Spencer
ATTORNEY

United States Patent Office 3,350,171
Patented Oct. 31, 1967

3,350,171
VAPOUR PHASE OXIDATION
Alan Edward Callow, Normanby, Middlesbrough, and William Hughes and James Dennis Groves, Fairfield, Stockton-on-Tees, England, assignors to British Titan Products Company Limited, Durham, England, a company of England
Continuation of application Ser. No. 774,736, Nov. 18, 1958. This application Jan 20, 1964, Ser. No. 338,982
16 Claims. (Cl. 23—202)

This is a continuation of co-pending U.S. application Ser. No. 774,736, filed on Nov. 18, 1958, and now forfeited. This invention relates to the vapour phase oxidation of titanium tetrachloride and of other halides which react with oxygen under highly exothermic conditions. It is known that when titanium tetrachloride reacts with oxygen, heat of reaction is evolved which would suffice, if effectively used, to maintain the reaction at a suitable temperature, within the range of, say, 800 to 1200° C., with the product gases issuing from the reaction chamber at that temperature.

Many processes have been described for the manufacture of titanium oxide from titanium tetrachloride by oxidation with oxygen or oxygen-containing gases. Such processes include the admission of titanium tetrachloride and oxygen gases into an empty chamber, through burners of various designs, but in all these cases, auxiliary heating has been necessary and usually accomplished by preheating the gases or by supplying heat through the chamber wall, or by combustion of fuels within the chamber. Such auxiliary heating was not required in order to maintain the temperature of reaction but only to cause ignition of the reactants by raising their temperature. The excess heat generated by the reaction was not used for pre-heating the gases. Therefore the auxiliary heat was super-added to the reaction heat, thus wasting heat and leading to an unnecessarily and undesirably high reaction temperature.

In a recent development, however, the vapour phase oxidation of titanium tetrachloride has been conducted in a bed of inert material. According to this type of process the bed material, initially pre-heated, serves to heat up the reactants to the reaction temperature whereupon the heat of reaction liberated in consequence of the reaction is transmitted to the bed material. Thus, by the turbulent conditions existing in a fluid bed operation the heat of reaction can be utilised to pre-heat the reactants by virtue of the solid inert material constituting the bed. The process has certain disadvantages, particularly a tendency for the metal oxide reaction product to precipitate upon and adhere to the solid inert bed material. It will be seen that there has been lacking a means for transmitting the heat of reaction to the reactants without the assistance of solid surfaces.

In the process, already mentioned, where cold reactant gases are led into a pre-heated empty chamber, it will be appreciated that the cold gases entering, for instance, via a burner at one end of the chamber, will tend to cool the chamber in that locality and must therefore proceed through the chamber until they attain the temperature of the reaction. The heat then evolved will in turn be used to pre-heat further cold gases progressing through the chamber, but the heat zone will tend to move farther away from the point of gas entry until such zone reaches the furthest end of the chamber when, failing a supply of continued auxiliary heat, the chamber as a whole will become too cold for reaction to be possible anywhere therein.

The present invention is an improvement in a vapour phase oxidation process of the kind in which titanium tetrachloride, or other metallic halide or metalloid halide (such as a silicon halide) which reacts exothermically with oxygen or oxygen-containing gas, is reacted with such gas in an empty chamber, i.e. a chamber with remote walls and substantially without extraneous solid surfaces.

The improvement according to the invention is characterised in that the admission into the chamber of the reactants, i.e. halide vapour and oxygen or oxygen-containing gases, and the course of travel imposed on the gaseous reaction products are such that with the return of a substantial part of the reaction gases, said reaction products associate with the reactants and thereby raise their temperature to the level that is necessary to maintain the reaction. The process may be carried out by admitting the reactants into the chamber with such kinetic energy that a turbulent flow thereof is created in the chamber causing an entrainment with the reactants of a substantial part of the gaseous reaction products.

It has been found that if the halide and the oxidising gas are admitted separately or in admixture into an empty pre-heated reaction chamber of sufficient size and under turbulent conditions, the gas stream will expand seemingly in the form of a cone or like divergent shape. This action has the effect of producing a condition which causes a change of direction of flow of the gases so that a substantial part thereof travels back towards the point of entry. We refer hereinafter to this effect as being in the nature of a recirculation or recycling, but we do not wish to be limited by putting forward this particular conception of the effect in question.

The effect is particularly pronounced if one or both of the reactants in gaseous form is or are introduced into the reaction chamber through an orifice or nozzle which promotes high velocity and turbulence, because the reactants will then tend to entrain the surrounding gas very rapidly. The mixing with this surrounding gas, consisting mainly of the hot products of reaction, serves to raise the temperature of the incoming gases to reaction-point very rapidly. Accordingly, there is obtained a relatively large volume of product gas (and possibly entrained solid product) which, after leaving the main reaction zone, is partially recycled in a continuous manner to mix with the incoming reactants. To be effective, this volume of hot recycled gas must be sufficient to heat the cold reactants to a temperature at which they will react. In the case of titanium tetrachloride and oxygen, it has been found sufficient, in order to effect reaction, to recycle five parts by weight of the mixed products of reaction to one part by weight of the cold reactants introduced into the chamber. Although in some reactions the desired recirculation might be effected by mechanical means such as by means of a fan, this would be impracticable in reactions such as those now under consideration in which at least one of the hot products, e.g. chlorine, is so corrosive. The present invention obviates recourse to mechanical devices by providing the entering reactants with a high kinetic energy which will bring about the required recirculation and association of a substantial part of the reaction gases with the reactants.

To effect this recirculation, either or both of the reaction gases is or are fed to a jet, nozzle or other inlet of restricted cross-sectional area under such pressure as to produce the required velocity. Normally, this pressure will not need to be greater than 8 lbs. per square inch. Although higher pressures may be used, such a variation is normally uneconomical. Lower pressure may also suffice but it is essential that Reynolds number of the gas or vapour at the inlet should be in excess of 50,000 and preferably greater than 150,000. As is well known the Reynolds number is $4W/P\mu$ where W is the rate of fluid flow at the inlet in grams per second, P is the length of the inside perimeter of the inlet in centimetres and $\mu$ is the viscosity of the fluid under upstream conditions (grams/centimetres per second). Reference may be made to "Chemical Engineers' Handbook" by Perry, 3rd Edition, page 375 wherein Reynolds number is defined.

This flow number is computed conveniently according to the following equation:

$$\text{Reynolds number } N = \frac{4W}{P\mu}$$

where $N$ = Reynolds number and is dimensionless
$W$ = the flowrate of fluid at the inlet (lbs./second)
$P$ = the length of wetted perimeter (feet)
$\mu$ = the viscosity of fluid under upstream conditions (lbs./feet per second)

The viscosities for titanium tetrachloride vapour and oxygen used for calculation are as follows:

| TiCl₄ Vapour | | O₂ | |
| --- | --- | --- | --- |
| T., °C. | Viscosity (cp.) | T., °C. | Viscosity (cp.) |
| 136 | 1.20×10⁻² | 20 | 2.02×10⁻² |
| 150 | 1.24×10⁻² | 100 | 2.37×10⁻² |
| 200 | 1.39×10⁻² | 150 | 2.59×10⁻² |
| 250 | 1.51×10⁻² | 200 | 2.80×10⁻² |
| 300 | 1.67×10⁻² | | |

With a burner, as per Example 2, having a central orifice $\frac{7}{16}$ in. diameter and titanium tetrachloride vapour admitted at 150° C., the Reynolds number according to the above is calculated as follows—

$P$ = Wetted perimeter of $\frac{7}{16}'' =$ $$\pi \times \tfrac{7}{16} \times \tfrac{1}{12} = 0.115 \text{ ft.}$$

$W$ = Wgt. rate of flow = $8 \times \tfrac{1}{60} = 0.133$ lbs./sec.

$\mu$ = Viscosity TiCl₄ vapour at 150°C.
$= 1.24 \times 10^{-2} \times 6.73 \times 10^{-4}$
$= 8.34 \times 10^{-6}$ lbs./ft. sec.

Hence $N = \dfrac{4W}{P\mu} = \dfrac{4 \times 0.133}{0.115 \times 8.34 \times 10^{-6}}$ $= 5.56 \times 10^5$ The oxygen at a temperature of 160° C. flows through the annulus of said burner, i.e. between walls having internal diameters of ⅞ in. and $\frac{9}{16}$ in. respectively and the following is a calculation of its flow number—

Wetted perimeter = $\pi(\tfrac{7}{8}'' + \tfrac{9}{16}'')\tfrac{1}{12} = 0.375$ ft.

$W$ = 2 lbs./min. = 0.033 lbs./ft. sec.

$\mu = 2.61 \times 10^{-2}$ cp. = $2.61 \times 10^{-2} \times 6.73 \times 10^{-4}$
$= 1.76 \times 10^{-5}$ lbs./ft. sec.

$$N = \frac{4W}{P\mu} = \frac{4 \times 0.33}{0.375 \times 1.76 \times 10^{-5}} = 2.0 \times 10^4$$

It is also important that the reaction chamber into which the reactants are led at high velocity should be sufficiently large so as not to impede the recirculatory flow of the hot product gas. Thus, for example, where a circular orifice is centrally-disposed in a cylindrical reaction chamber, the diameter or mean width of said chamber should not be less than 20 times, preferably at least 30 times, the diameter of the gas inlet orifice or orifices delivering gas at high velocity. Where the inlet is a circular orifice disposed centrally in a cylindrical chamber, the diameter of the chamber in feet would not normally be greater than 0.25 times the square root of $w$ where $w$ is the rate of gas flow through the orifice in lbs./hr.

It will be apparent that the desired recirculation may be encouraged by removing the final product stream from the chamber in the general neighborhood of the point at which the reactants are introduced, thereby causing a natural reversing flow within the chamber.

There is a wide range of metallic halides, or halides of elements such as silicon, e.g. those of titanium, aluminum, niobium, iron, chromium, zirconium, vanadium, tin and uranium, or mixtures thereof, present as the chloride, bromide or iodide, which may be oxidised by means of the process of this invention. Normally, however, the chloride is the halide preferred since it is more economic and readily available.

As indicated above, it is essential that a halide be selected which, by recirculation under the conditions described generally herein, will enable reaction to be effected without dependence upon auxiliary heating, other than as will be indicated below, where heat is required to convert such halide into vapour or for initially pre-heating the furnace chamber.

Normally, the various halides will be caused to react with oxygen, since by this means the heat loss is minimised through the absence of diluent gases. Further, the products of oxidation will be richer in halogen and hence more economically recoverable. On the other hand, the use of oxygen-containing gases, such as air, is not precluded providing there is adequate heat of reaction to maintain the reaction conditions essential to the invention.

The reactants may be premixed before passing through the constrictive gas inlet into the chamber or they may be introduced separately. In the latter instance, one or both is introduced under high velocity conditions.

The reactants are introduced in the form of gas or vapour, so that where one or more of them exists in the condensed phase under normal atmospheric conditions it or they should be vapourised by pre-heating before feeding, and maintained above saturation-point on entering the nozzle or orifice serving as gas inlet to the reaction chamber. Further pre-heating is however, unnecessary.

It will be appreciated that, since certain halides may not be readily volatilised at relatively low temperatures and the present invention is concerned primarily with such halides which are volatisable at only moderately high temperatures, preferably below 600° C. there will be pre-heating to the extent required for volatisation but not to the extent, as in prior processes, for supplying heat to maintain the reaction in an empty chamber. The invention does not contemplate pre-heating to temperatures far in excess of the normal boiling point of the particular halide.

When starting the process, ignition of the gases must be initiated. Pre-heating of the chamber might be considered suitable for such purpose, but in practice this may necessitate temperatures in the reaction chamber higher than is desirable and occasionally may present other difficulties. It has been found more convenient to initiate the process by using an auxiliary flame such as that which is produced by the combustion of fuel gas, e.g. coal gas, either in oxygen or in air. By this means, once the circulation is established, i.e. within a period of seconds, this auxiliary flame can be removed and the process thereafter made self-sustaining and continuous. Obviously, however, if the reaction should cease for any reason the auxiliary burner would have to be used again in order to re-initiate the reaction.

From the foregoing description, it will be apparent the process of the invention involves the use of sizeable apparatus adequate, for instance, to produce at least one ton of TiO₂ per day: hence a reaction chamber normally constructed from chlorine-resisting brickwork, suitably backed by insulating brick and contained usually within a steel shell, will be necessitated. Such plant is normally heat-resistant and by this means unnecessary losses of heat to the surroundings, such as would occur on a small experimental scale, are obviated.

The conditions, particularly with respect to temperature, preferred in connection with the oxidation of various metallic halides, or halides of metalloids such as silicon, may vary considerably. Thus, in the case of the vapour phase oxidation of titanium tetrachloride, the normal temperature range over which the oxidation may be conducted is from 800 to 1200° C. and preferably between 900 and 1100° C.

In the operation of the process for vapour phase oxidation of titanium tetrachloride, it has been found that the particle size of the titanium oxide may be controlled by suitable additions of water vapour to the reaction mixture and, where the reactants are added separately, it is preferably admitted admixed with oxygen-containing gases. It has also been found that the particle size may be modified by additions of small proportions of silicon tetrachloride, preferably premixed as vapour with the titanium tetrachloride vapour.

The following examples, described with reference to the accompanying drawings, are given for the purpose of illustrating the invention:

Example 1

The reactor, shown diagrammatically in FIGURE 1 of the drawings, consists of a vertical cylindrical chamber 1 having an internal diameter of 18" and a height of 11 ft., the inner lining 2, showing plain hachured, consisting of high temperature refractory chlorine-resisting brickwork 11" thick, which is in turn surrounded by an outer insulating brickwork 3, shown cross hachured, 4½" thick, the whole being supported in a steel shell 4, with openings about which are welded collars 5 and 6 terminating with flanges 7 and 8 to correspond to the top and bottom of the reactor respectively. The top opening of the cylinder is suitably sealed by a plate 9 with a heat insulating brick 9a attached to the underside serving to neatly fit inside the steel collar 5. Through this seal is inserted the main burner 10 by which the reactants are fed, the titanium tetrachloride via conduit 11 and the oxygen via conduit 12. This main burner extends to a depth of 6 ft. inside and along the axis of the chamber, i.e. to a point 13. Through the seal there passes also a refractory ducting 14 by which the products of reaction are removed. The bottom of the reaction chamber is suitably sealed by a plate 15 having surmounted thereon an insulating brick 16, nine inches thick, which neatly fits into the collar 6. Through this plate 15 and brick 16, axially, with respect to the chamber, i.e. through opening 17, there is inserted a small static gas poker 18 by which coal gas via conduit 19 and air or oxygen via conduit 20 are fed to the chamber. The main burner 10 is shown in more detail in FIGURE 2. It consists of a stainless steel metal tube 31, 2½" internal diameter, with flange 32 for affixture to the top of the furnace, the tube being terminated at the outer feed end by a flange 33 to which there is affixed the titanium tetrachloride inlet 34. At this end of the burner is an inlet 35 for admission of the oxygen or oxidising gas stream. The burner tube is terminated at the other end, i.e. at the point of entry 36 of the gases into the chamber, by a square-edged nozzle 37 (¾" diameter), the burner tube from the flange 32 to the end 36 being surrounded by high temperature lagging 38 approximately 1" thick, sealed with a silicate cement.

The reaction chamber, with the main burner temporarily removed, has a mobile gas poker inserted through the hole normally occupied by the main burner and by means of this mobile burner, the reaction chamber is raised by the admission of coal gas and air to a temperature of 1100° C. At this point, the small static gas poker 18 is lighted and the mobile poker removed and replaced by the main burner as described.

Figure 2:
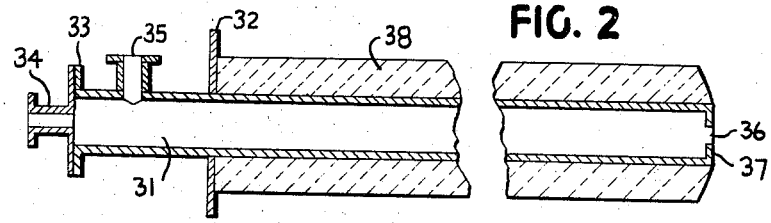

Gaseous titanium tetrachloride, at a temperature of 150° C., and at the rate of 8 lbs. per minute, is thereafter fed through the inlet 34, shown in FIGURE 2, and at the same time, oxygen is fed through the inlet 35 at a temperature of 170° C. and at the rate of 2 lbs. per minute. As soon as chlorine is detectable in the exit duct 14 (FIGURE 1), the static burner is extinguished and the reaction is allowed to proceed for a period of 90 minutes, during which time a temperature of 1050–1100° C. is maintained within the reactor. The products of reaction discharge via the duct 14.

Samples taken during the run indicate that the combustion of the titanium tetrachloride is substantially complete and the solid product, which is subsequently removed from the gases, contains 99% TiO$_2$ and has a mean particle size of 2–5 microns.

Example 2

Figure 3:
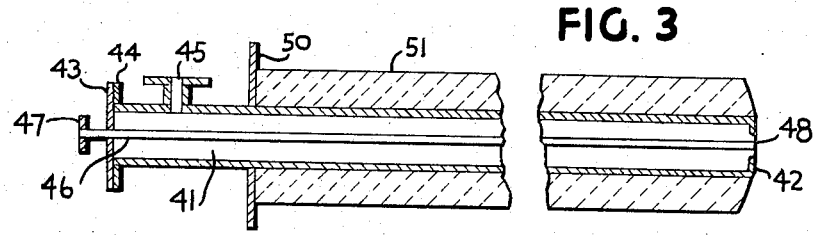

The reaction chamber is similar to that described in Example 1 but in this case the main burner is of a construction indicated in FIGURE 3, to permit introduction of the reactants separately into the reaction chamber in the manner of a concentric tube burner. The burner consists of a stainless steel metal tube 41, 2½" diameter, constructed to extend 6 ft. into the chamber and terminating within the chamber, in a ⅞" diameter nozzle 42 and sealed externally by means of plate 43 affixed to the flange 44. Into the side of this tube is an inlet 45 for the oxygen supply. Fitted through the end plate 43 is a ducting 46 terminating at flange 47 for admission of the titanium tetrachloride. This stainless steel metal ducting extends to the point of entry of gases into the reaction chamber, i.e. to the point 48 and having a diameter at this point of $7/16$", thus permitting the entry of titanium tetrachloride within the concentric stream of oxygen at this point. This burner projects into the furnace to the extent of 6 ft., being affixed to the chamber by means of the flange 50. The whole of the outer surface of the burner, i.e. from the flange 50 to the end 42 is lined with high temperature lagging 1" thick 51, sealed with a silicate cement.

The chamber is pre-heated as in Example 1, using a mobile gas poker inserted in the hole through which the main burner is normally affixed. With the small static gas poker lighted, the main burner is substituted for the mobile gas burner and titanium tetrachloride is admitted at a temperature of 150° C. and at the rate of 8 lbs. per minute. At the same time, oxygen containing 1.3% by weight water vapour is admitted via tube 45 at the rate of 2 lbs. per minute. As soon as reaction is initiated, the small static gas poker is extinguished and reaction allowed to continue for a period of 90 minutes during which a temperature of 1050–1100° C. is maintained by the reaction.

Samples indicate that reaction is substantially complete and the titanium oxide reaction product contains 99% TiO$_2$ and has a mean particle size of 0.6 micron.

Example 3

Figure 4:
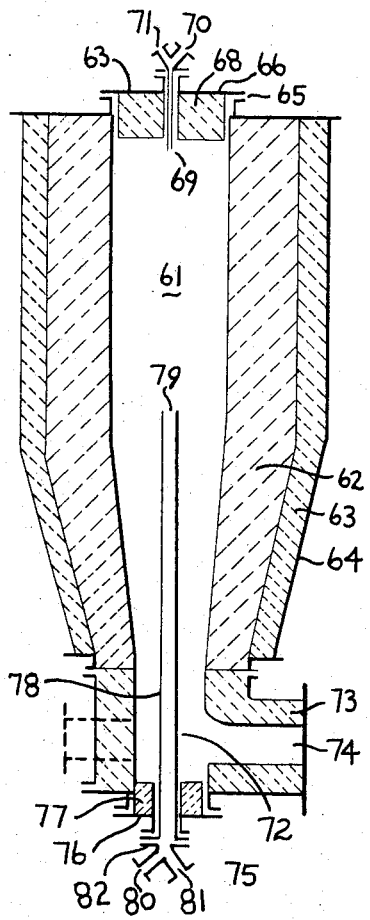

The reaction chamber 61 is constructed as depicted in FIGURE 4 and differs from the apparatus used in the previous examples, mainly in that the reactants are admitted from the bottom instead of the top of the chamber. It consists in the main of a vertical cylindrical vessel 11 ft. high, the upper section, for a depth of 7 ft., having a diameter of 18", the lower section tapering to 12" diameter at the base. The vessel is lined with high temperature refractory chlorine-resisting brickwork 11" thick, shown plain hachured 62, surrounded by a lining of 4½" thick insulating brickwork, shown cross-hachured 63, the whole contained in a steel shell 64. The opening at the top of the furnace is sealed at a flanged end 65 on which is mounted a plate 66 carrying on the underside a 9" thick insulating brick seal 67. Through the brick seal is a port 68 which is axial with the furnace. Into this port is inserted a static gas poker 69 by which coal gas via conduit 70 and oxygen via conduit 71 can be fed for igniting the flame. To the base of the furnace is a T-piece construction 72 suitably lined with 6" thick refractory concrete 73. By means of this T-piece the exit gases are removed via the opening 74. The bottom end of the T-piece is closed by a plate 75 supporting an insulated brick 76 which neatly fits through the collar 77. Through the brick 76 is normally inserted the main burner 78 which extends to a point halfway up the furnace and is fed with titanium tetrachloride via conduit 80 and oxygen via conduit 81, the burner being affixed by flanges 82. The main burner 78 is constructed as described in Example 2, i.e. it is a concentric burner as depicted in FIGURE 3.

To pre-heat the reaction chamber the main burner 78 is temporarily removed and replaced by a mobile poker fed with coal gas and air and the reaction chamber is pre-heated by this ignited poker to a temperature 1100° C. At this stage, the static gas poker is lighted and the mobile poker removed and replaced by the recirculation burner.

Referring to FIGURE 3, gaseous titanium tetrachloride containing 4% by weight silicon tetrachloride is admitted at a temperature of 150° C. and at the rate of 8 lbs. per minute via the ducting 47; at the same time, oxygen containing 1.3% by weight moisture is admitted at the rate of 2 lbs. per minute via the ducting 45. As soon as chlorine is detected in the exit gas, the small static gas poker 69 (FIGURE 4) is extinguished. The heat of reaction maintains the temperature of the furnace between 1050–1100° C. and the titanium oxide product of reaction is separated and examined.

It is found, operating in this way, that the conversion of the chlorides to solid oxides is substantially complete, the particle size of the solids being about 0.4 $\mu$.

*Example 4*

The equipment as described in Example 3 (that is the burner, as illustrated in FIGURE 3, and reaction chamber as illustrated in FIGURE 4) were used to carry out the oxidation of silicon tetrachloride, as follows:

After pre-heating the reactor as described in Example 3, and while still maintaining the gas flame through inlet 69 (FIGURE 4), a stream of 4.65 lbs./min., of silicon tetrachloride vapour, at a temperature of 120° C. was introduced into the reaction chamber, through tube 46, (FIGURE 3) of burner tube 78 (FIGURE 4) and at the same time, a stream of 2.36 lbs./min. of oxygen at a temperature of 100° C. was introduced through ducting 45 (FIGURE 3). The oxygen stream contained water vapour sufficient to react with 2% of the silicon tetrachloride.

After the lapse of 3 minutes, the gas and air streams entering through ports 70 and 71, were stopped, and the reaction of the silicon tetrachloride with oxygen continued in the furnace chamber, eventually maintaining a temperature therein of 1020° C. More than 99.5% of the silicon tetrachloride was reacted in this manner to form a pure silicon dioxide with a mean particle size of about 15 millimicrons.

*Example 5*

The equipment as described in Example 3, (that is the burner, as illustrated in FIGURE 3, and reaction chamber as illustrated in FIGURE 4) were used to carry out the oxidation of ferric chloride as follows:

The reactor (FIGURE 4) was pre-heated to a temperature of 900° C. by means of gas and air burning at the burner 69. When this temperature had been reached, a stream of 2.67 lbs./min. of oxygen at a temperature of 100° C. was fed into the reactor by tube 45, of the burner illustrated in FIGURE 3. Ferric chloride vapour containing 3% by volume of free chlorine was then introduced at a temperature of 350° C. through the tube 46 of the burner illustrated in FIGURE 3; this ferric chloride vapour was produced by electric heating of a melt containing ferric and sodium chlorides, and was admitted to the tube 46 at a rate of 14.3 lbs./min. 5 minutes after starting the flow of ferric chloride vapour, the flow of gas and air to ports 70 and 71 were shut off, whereupon the ferric chloride vapour continued to react with the oxygen, the heat of reaction sufficing to maintain a temperature of 700–750° C. in the reaction chamber. Under these conditions, approximately 85% of the ferric chloride was converted to ferric oxide of particle size about 2–3 microns.

Figure 5:
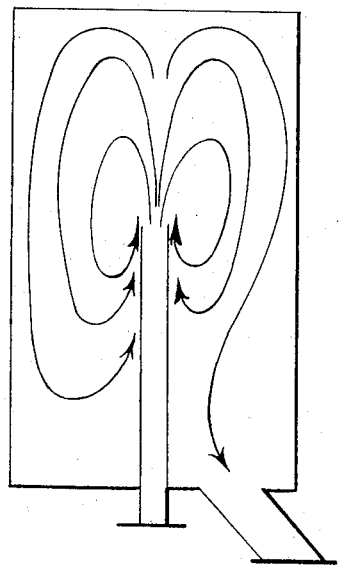

FIGURE 5 of the accompanying drawings illustrates very diagrammatically a typical way in which the reactants and reaction products will flow in the reaction chamber when operated according to the foregoing examples. Example 3 is taken for the purpose of illustration. It will be seen that the reactants emerge from the nozzle in a forceful divergent stream and intermingle with reaction products which recirculate back into the reaction zone, whereby the incoming reactants are quickly heated to reaction temperature.

It will be seen from the more particular description given in the foregoing examples illustrating the performance of the process of the invention that the discharge of the gaseous reaction products takes place at the same end of the reaction chamber as that where the reactants are admitted. This arrangement in conjunction with the high kinetic energy of the incoming reactants produces, as has been shown, the desired return flow of the reaction products and the entrainment and association of a substantial part thereof with the incoming reactants. However, other arrangements may be used whereby the desired result is obtained. For instance the reaction products, or a substantial part thereof, may be delivered at a point remote from where the reactants are admitted, from the chamber into a duct leading back into the chamber at a point in the vicinity of the admission of the reactants. The latter, due to their high velocity flow exert suction to draw the reaction products through the duct. In this case there may be a discharge exit from the chamber at a point remote from the admission of the reactants so that a part of the reaction products will be continuously discharged whilst another part is being returned through the duct to be brought into intimate association with the incoming reactants.

What we claim is:

1. In a process for preparing a metallic oxide by the reaction of oxygen with at least one oxidizable, volatile, metallic halide selected from the group consisting of chlorides, bromides, and iodides, the improvement which comprises introducing the oxygen and metallic halide reactants into a reaction zone which is at a temperature at which said reactants will react, at least one of said reactants being introduced into the zone at a Reynolds number of at least 50,000 and recovering the resulting oxide, said Reynolds number being calculable as the ratio, in consistent units, of four times the rate of fluid flow at the reaction zone inlet to the product of the length of the inside perimeter of said inlet and the fluid viscosity under the conditions upstream of said inlet.

2. The process of claim 1 wherein the temperature of the oxygen and metallic halide when introduced into the reaction zone is such that a mixture thereof does not form said metal oxide.

3. In a process for preparing metallic oxide by reacting an oxygen containing reactant with at least one oxidizable, volatile, metallic halide reactant in which the halide portion of said metallic halide reactant is selected from the group consisting of chloride, bromide and iodide and wherein said reaction is conducted within a reaction zone which is at a temperature at which said reactants will react, the improvement which comprises introducing at least one of said reactants into the zone at a Reynolds number of at least 150,000 whereby sufficient turbulence is created to heat to reaction temperature further reactants introduced into said zone and recovering said oxide; the temperature of said reactants when introduced into said zone being such that a mixture thereof does not form a metal oxide, said Reynolds number being calculable as the ratio, in consistent units, of four times the rate of fluid flow at the reaction zone inlet to the product of the length of the inside perimeter of said inlet and the fluid viscosity under the conditions upstream of said inlet.

4. The process of claim 3 wherein the reactant at a Reynolds number of at least 150,000 is introduced into the reaction zone through an orifice, the reaction zone being contained within a reaction chamber having a diameter of at least 20 times the diameter of the orifice.

5. The process of producing particulate metal oxide by reaction of a vaporous halide selected from the group consisting of chlorides, bromides and iodides of the metal with oxygen, which comprises flowing in a common direction said halide and at least a stoichiometric amount of oxygen to form said metal oxide to a chamber which is at a temperature in excess of 500° C., the temperature of said metal halide and oxygen on introduction to said chamber being such that a mixture thereof does not form said metal oxide and at least one of said halide and oxygen being fed to said chamber in a stream at a Reynolds number in excess of 50,000, reacting oxygen and said halide in said chamber to form said metal oxide suspended in hot reaction product gases, flowing a sufficient amount of said hot suspension in an opposite direction to said common direction whereupon to heat further of said halide and oxygen introduced to said chamber to the temperature of said reaction, and recovering particulate metal oxide from said chamber, said Reynolds number being calculable as the ratio, in consistent units, of four times the rate of fluid flow at the reaction zone inlet to the product of the length of the inside perimeter of said inlet and the fluid viscosity under the conditions upstream of said inlet.

6. The process of producing pigmentary titanium oxide by reaction of vaporous titanium tetrachloride with oxygen, which comprises flowing, in a common direction, said titanium tetrachloride and at least a stoichiometric amount of oxygen to form titanium oxide to a chamber which is at a temperature in excess of 500° C., the temperature of said titanium tetrachloride and oxygen on introduction to said chamber being such that a mixture thereof does not form titanium oxide, at least one of said titanium tetrachloride and oxygen being fed to said chamber in a stream at a Reynolds number in excess of 50,000, reacting oxygen and said tetrachloride in the chamber to form said titanium oxide suspended in hot reaction product gases, flowing a sufficient amount of said hot suspension in an opposite direction to said common direction to heat further of said tetrachloride and oxygen introduced to said chamber to the temperature of said reaction, and recovering pigmentary titanium oxide from the chamber, said Reynolds number being calculable as the ratio, in consistent units, of four times the rate of fluid flow at the reaction zone inlet to the product of the length of the inside perimeter of said inlet and the fluid viscosity under the conditions upstream of said inlet.

7. The process of claim 5 wherein the Reynolds number is in excess of 150,000.

8. The process of claim 6 wherein the temperature in the chamber is in excess of 800° C.

9. In a process for preparing titanium oxide by the exothermic vapor phase reaction of titanium tetrachloride and oxygen, the improvement which comprises feeding titanium tetrachloride and oxygen reactants at a temperature such that a mixture thereof is below the temperature of reaction into a reaction zone chamber, introducing a heat source into said chamber to heat the reactants to reaction temperature, at least one of said reactants being fed into the chamber at a Reynolds number above 50,000 whereby sufficient turbulence is created to heat to reaction temperature further of said reactants introduced into said chamber at said Reynolds number, and removing the heat source from said chamber while continuing the feed of the reactants to said chamber at said number, said Reynolds number being calculable as the ratio, in consistent units, of four times the rate of fluid flow at the reaction zone inlet to the product of the length of the inside perimeter of said inlet and the fluid viscosity under the conditions upstream of said inlet.

10. In the process of preparing an oxide by the vapor phase oxidation of at least one vaporous halide selected from the group consisting of metal and metalloid chlorides, bromides and iodides wherein said halide is reacted with oxygen, the improvement which comprises introducing said halide and oxygen at a temperature such that a mixture thereof is below the temperature of reaction into a reactor chamber, introducing a heat source into said reactor chamber to heat the halide and oxygen reactants to reaction temperature thereby producing a hot gaseous reaction product mixture comprising an oxide of said halide, at least one of said reactants being introduced at a Reynolds number of at least 50,000 to provide a turbulent body in said chamber thereby heating further of said halide and oxygen to the temperature of reaction and removing the heat source from the chamber while continuing the feed of the reactants to said chamber at said Reynolds number, said Reynolds number being calculable as the ratio, in consistent units, of four times the rate of fluid flow at the reaction zone inlet to the product of the length of the inside perimeter of said inlet and the fluid viscosity under the conditions upstream of said inlet.

11. In the process of preparing titanium dioxide by the reaction of titanium tetrachloride with oxygen, the improvement which comprises feeding titanium tetrachloride and oxygen reactants in a common direction into a reactor chamber, interposing an auxiliary flame in the path of movement of said reactants to react the titanium tetrachloride with the oxygen and form a hot reaction mixture, feeding at least one of said reactants into the chamber at a Reynolds number of at least 50,000 whereby a cyclic flow of hot reaction mixture to the point of entry of at least one reactant into the chamber is established, maintaining the flame in operation until sufficient recycling of the reaction mixture is established to maintain the reaction, and then extinguishing the auxiliary flame while continuing the feed of the reactants into the chamber, said Reynolds number being calculable as the ratio, in consistent units, of four times the rate of fluid flow at the reaction zone inlet to the product of the length of the inside perimeter of said inlet and the fluid viscosity under the conditions upstream of said inlet.

12. The process of claim 11 wherein at least one reactant is fed into the chamber at a Reynolds number of at least 150,000.

13. A process of preparing titanium dioxide by the exothermic reaction of titanium tetrachloride and oxygen in the vapor phase which comprises premixing titanium tetrachloride and at least a stoichiometric amount of oxygen to form a reactant mixture at a temperature below 500° C., introducing the reactant mixture through an orifice into a reaction chamber, said chamber having a mean diameter of at least 20 times the diameter of the orifice, establishing an auxiliary flame in the reaction chamber in the path of the reactants to heat the reactants mixture to a reaction temperature range of 800° C. to 1200° C. such that there is formed a hot gaseous product mixture containing titanium dioxide, the reactants mixture being introduced to the reaction chamber at a flow rate sufficient to exceed a Reynolds number of at least 150,000 thereby establishing sufficient turbulence in said chamber such that the hot gaseous mixture recirculates back toward the reactants mixture introduced into the chamber, maintaining the auxiliary flame until a sufficient recirculation of the gaseous product mixture is established such that the reaction of titanium tetrachloride and oxygen is self-sustaining and maintained by its own exothermic heat of reaction, and then withdrawing the auxiliary flame from the reaction chamber while continuing the feed of the reactants mixture to the chamber, said Reynolds number being calculable as the ratio, in consistent units, of four times the rate of fluid flow at the reaction zone inlet to the product of the length of the inside perimeter of said inlet and the fluid viscosity under the conditions upstream of said inlet.

14. A process of preparing particulate metallic oxide by the reaction of a vaporous halide selected from the group consisting of chlorides, bromides and iodides of the metal with oxygen, which comprises flowing said halide and oxygen reactants to a chamber which is at a temperature in excess of 500° C., the temperature of said metal halide and oxygen on introduction to said chamber being such that a mixture thereof does not form said metal oxide and at least one of said reactants being fed to the chamber at a Reynolds number in excess of 50,000, reacting said reactants in said chamber to form as reaction product hot metal oxide suspended in hot, reaction product gases thereby forming a hot turbulent body comprising said reaction product which heats further of said halide and oxygen introduced to said chamber to the temperature of reaction, and recovering particulate metal oxide from said chamber, said Reynolds number being calculable as the ratio, in consistent units, of four times the rate of fluid flow at the reaction zone inlet to the product of the length of the inside perimeter of said inlet and the fluid viscosity under the conditions upstream of said inlet.

15. A process of preparing pigmentary metallic oxide by the vapor phase reaction of at least one metallic halide selected from the group consisting of chlorides, bromides and iodides and oxygen which comprises introducing the halide and oxygen reactants below the temperature of reaction into a reactor chamber, supplying auxiliary heat to the chamber in an amount sufficient to initiate the reaction, at least one of said reactants being introduced through an orifice at a velocity of flow corresponding to a Reynolds number of at least 50,000, the mean diameter of the chamber being at least 20 times that of the orifice, and terminating the supply of auxiliary heat after the initiation of the reaction, said Reynolds number being calculable as the ratio, in consistent units, of four times the rate of fluid flow at the reaction zone inlet to the product of the length of the inside perimeter of said inlet and the fluid viscosity under the conditions upstream of said inlet.

16. The process of claim 15 wherein at least one reactant is introduced at a Reynolds number of at least 150,000.

References Cited

UNITED STATES PATENTS

| | | | |
|---|---|---|---|
| 1,513,622 | 10/1924 | Manning. | |
| 1,850,286 | 3/1932 | Mittasch et al. | 23—202 |
| 2,395,314 | 2/1946 | Blumer | 23—219 |
| 2,445,691 | 7/1948 | Pechukas | 23—202 |
| 2,791,490 | 5/1957 | Wilcox | 23—182 X |
| 2,855,273 | 10/1958 | Evans et al. | |
| 2,937,928 | 5/1960 | Hughes et al. | 23—202 |

OTHER REFERENCES

"Fluorine Chemistry," vol. 1, pp. 3 and 36, by Dr. J. H. Simons, 1950 edition. Academic Press Inc., Publishers, New York, N.Y.

MILTON WEISSMAN, *Primary Examiner.*

EDWARD STERN, OSCAR R. VERTIZ, *Examiners.*